United States Patent
Crowell et al.

(10) Patent No.: US 8,690,009 B2
(45) Date of Patent: Apr. 8, 2014

(54) AUTOMATED VACUUM ASSISTED VALVE PRIMING SYSTEM AND METHODS OF USE

(75) Inventors: Cutler Crowell, San Diego, CA (US); Erik Fiske, Carsbad, CA (US); Horatio Quinones, San Marcos, CA (US); Brian Sawatzky, Carlsbad, CA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 13/063,796

(22) PCT Filed: Sep. 18, 2009
(Under 37 CFR 1.47)

(86) PCT No.: PCT/US2009/057403
§ 371 (c)(1),
(2), (4) Date: Jul. 5, 2011

(87) PCT Pub. No.: WO2010/033758
PCT Pub. Date: Mar. 25, 2010

(65) Prior Publication Data
US 2011/0315232 A1    Dec. 29, 2011

Related U.S. Application Data

(60) Provisional application No. 61/098,048, filed on Sep. 18, 2008.

(51) Int. Cl.
*B67D 1/00* (2006.01)

(52) U.S. Cl.
USPC ............... 222/52; 222/53; 222/56; 222/504; 222/152; 222/1

(58) Field of Classification Search
USPC ......... 118/300, 684, 712, 664, 666, 323, 324, 118/3, 710, 711; 222/1, 504, 509, 571, 50, 222/52, 53, 56, 63, 57, 58, 386.5, 389, 334; 137/14, 565.11, 15.06; 406/14; 415/169.1, 169.2
See application file for complete search history.

(56) References Cited

U.S. PATENT DOCUMENTS 2,778,800 A * 1/1957 Sheahan .................. 261/49

(Continued)

FOREIGN PATENT DOCUMENTS

JP    H11513607 A    11/1999

(Continued)

OTHER PUBLICATIONS

International Searching Authority, International Search Report and Written Opinion issued in related International application No. PCT/US2009/057403 dated Oct. 25, 2009.

(Continued)

*Primary Examiner* — Frederick C Nicolas
*Assistant Examiner* — Bob Zadeh
(74) *Attorney, Agent, or Firm* — Wood, Herron & Evans LLP (57) ABSTRACT

An automated system (10) and methods (11) for priming a fluid chamber (12) of a fluid dispensing valve (14) with fluid (16) from fluid material source that includes a vacuum source (46), a valve priming station (32), a vacuum switch (54), and a controller (62). The valve priming station (32) has a boot (40), a vacuum chamber (36), and a vacuum channel (42) in the boot (40). The vacuum channel (42) connects with the vacuum source (46) via the vacuum chamber (36). The boot (40) sealingly engages a valve nozzle (28) of the fluid dispensing valve (14) so that the vacuum chamber (36) connects the vacuum source (46) with the fluid chamber (12). The vacuum switch (54) couples with the vacuum channel (42) via the vacuum chamber (36) and has an opened and closed position based upon a vacuum level in the vacuum chamber (36). The controller (62) is electrically connected with the vacuum source (46) and vacuum switch (54) and controls priming of the fluid dispensing valve (14) based upon whether the vacuum switch (54) is opened or closed.

27 Claims, 5 Drawing Sheets

(56) References Cited

U.S. PATENT DOCUMENTS

| | | | |
|---|---|---|---|
| 2,969,807 A * | 1/1961 | Whitten | 251/47 |
| 3,620,294 A * | 11/1971 | Hetzel et al. | 164/155.4 |
| 3,791,342 A * | 2/1974 | Boyer et al. | 118/52 |
| 4,023,592 A * | 5/1977 | Patzke et al. | 137/565.12 |
| 4,457,271 A | 7/1984 | Fitch | |
| 4,574,851 A * | 3/1986 | Lepisto | 141/68 |
| 4,787,332 A * | 11/1988 | Geisel et al. | 118/692 |
| 5,052,338 A * | 10/1991 | Maiorca et al. | 118/668 |
| 5,319,568 A * | 6/1994 | Bezaire | 700/123 |
| 5,408,891 A | 4/1995 | Barber et al. | |
| 5,505,777 A | 4/1996 | Ciardella et al. | |
| 5,525,515 A | 6/1996 | Blattner | |
| 5,558,504 A * | 9/1996 | Stridsberg | 417/322 |
| 5,827,744 A | 10/1998 | Fose et al. | |
| 5,906,682 A * | 5/1999 | Bouras et al. | 118/712 |
| 6,071,072 A * | 6/2000 | Chang | 415/56.2 |
| 6,117,237 A * | 9/2000 | Yapel et al. | 118/410 |
| 6,173,864 B1 * | 1/2001 | Reighard et al. | 222/55 |
| 6,541,304 B1 | 4/2003 | Bouras et al. | |
| 6,707,163 B2 | 3/2004 | Chiu | |
| 6,775,879 B2 | 8/2004 | Bibeault et al. | |
| 6,955,946 B2 * | 10/2005 | Bouras et al. | 438/108 |
| 6,957,783 B1 | 10/2005 | Fugere | |
| 6,991,680 B2 | 1/2006 | Kojima | |
| 6,991,825 B2 * | 1/2006 | Hui et al. | 427/98.4 |
| 7,448,857 B1 | 11/2008 | Fugere | |
| 7,918,039 B2 * | 4/2011 | Kolb | 34/445 |
| 8,257,779 B2 * | 9/2012 | Abernathy et al. | 427/8 |
| 2004/0265185 A1 * | 12/2004 | Kitagawa | 422/100 |
| 2006/0029724 A1 * | 2/2006 | Babiarz et al. | 427/64 |
| 2006/0053748 A1 | 3/2006 | Ahn et al. | |
| 2007/0145164 A1 * | 6/2007 | Ahmadi et al. | 239/583 |
| 2008/0025801 A1 * | 1/2008 | Newbolt et al. | 406/14 |

FOREIGN PATENT DOCUMENTS

| | | |
|---|---|---|
| JP | 2003010756 A | 7/2001 |
| JP | 2004202325 A | 7/2004 |
| JP | 2006507193 A | 3/2006 |
| JP | 2008023669 A | 2/2008 |

OTHER PUBLICATIONS

International Bureau, International Preliminary Report on Patentability issued in related International application No. PCT/US2009/057403 dated Mar. 22, 2011.

U.S. Patent and Trademark Office, International Search Report and Written Opinion in PCT Application Serial PCT/uS2009/057403, Nov. 3, 2009.

European Patent Office, Supplementary Search Report issued in related European application No. 09 81 5234 dated Apr. 11, 2012.

Asymtek, "Fluidmove for Windows XP", User Guide, pp. 4-45; 4-46; 5-12; 5-13 (c) 2005, Carlsbad, CA.

The State Intellectual Property Office of the People's Republic of China, First Office Action issued in related Chinese patent application No. 200980136775.9 dated Dec. 31, 2012 and translation thereto.

Japanese Patent Office, Official Action issued in Japanese application No. 2011-527978 dated Dec. 16, 2013.

* cited by examiner

AUTOMATED VACUUM ASSISTED VALVE PRIMING SYSTEM AND METHODS OF USE

CROSS REFERENCE TO RELATED APPLICATIONS

This application claims the benefit of U.S. Provisional Application No. 61/098,048, filed Sep. 18, 2008, the disclosure of which is hereby incorporated by reference herein in its entirety.

TECHNICAL FIELD

The present invention relates to valve priming systems and methods and, more particularly, to automated systems and methods for priming a fluid chamber of a fluid dispensing valve.

BACKGROUND

The dispensing of liquid adhesives quickly and reliably in the manufacture of electronic circuit board assemblies with surface-mounted components is a difficult task. Rotary positive displacement pumps, pneumatically actuated syringes and momentum transfer jetting valves used in conventional fluid dispensing systems have inherent deposition accuracy limitations. For example, the deposition rate of fluid dispensed from a fluid dispensing valve may be influenced by regions of air trapped within the adhesive in the valve's fluid feed chamber, which may result in weight inconsistencies of dispensed fluid. Indeed, both the volume and shape of the dispensed fluid can be affected by the presence of an air bubble and can create the need for inspection and rework, which can increase fluid consumption and boost operating costs. As a result, the fluid dispensing process may impact the capability and throughput of an automated electronics assembly line.

While suppliers in the fluid dispensing industry have been able to make steady incremental improvements in reducing the presence of air bubbles via valve priming stations, the presence of air bubbles in the viscous material still continues to occur. As mentioned above, this phenomenon can adversely impact operation of the fluid dispensing valves and the cost of fluid dispensing. In addition, a lack of process automation and system verification can result in undesirable operator influences, as well as inefficient priming and set-up routines.

It would thus be beneficial to provide an improved system and method for valve priming that overcomes the aforementioned drawbacks and provides a level of process automation and system verification to help ensure consistent priming quality of the fluid dispensing valve.

SUMMARY

In one embodiment, an automated system is provided for priming a fluid chamber of a fluid dispensing valve with fluid from a source of fluid material supplied to the fluid chamber through a feed path between the fluid source and the fluid chamber. The system includes a vacuum source, a valve priming station, a vacuum switch, and a controller. The valve priming station includes a boot, a vacuum chamber, and a vacuum channel in the boot. The vacuum channel is connected with the vacuum source via the vacuum chamber. The boot is configured to sealingly engage a valve nozzle of the fluid dispensing valve so that the vacuum channel and vacuum chamber connect the vacuum source in fluid communication with the fluid chamber of the fluid dispensing valve. The vacuum switch, which is coupled in fluid communication with the vacuum channel via the vacuum chamber, has an opened position and a closed position based upon a vacuum level in the vacuum chamber. The controller is electrically connected with the vacuum switch and the vacuum source and is configured to power the vacuum source on and off. The controller is also configured to control priming of the fluid dispensing valve based upon whether the vacuum switch is in the opened or closed position.

In another embodiment, a method is provided for priming a fluid dispensing valve having a fluid chamber, a dispensing orifice, and a discharge passage connecting the dispensing orifice with the fluid chamber. The method includes applying a vacuum through the dispensing orifice to the discharge passage and the fluid chamber, then automatically determining whether a desired vacuum level is present based upon operation of a vacuum switch. The method further includes, in response to reaching the desired vacuum level and maintaining the desired vacuum level for a specified period of time, automatically causing a fluid to flow through a fluid feed path into the fluid chamber and through the discharge passage toward the dispensing orifice to prime the fluid dispensing valve.

In yet another embodiment, a method is provided for priming a fluid dispensing valve, which includes sealingly engaging a valve nozzle of a fluid dispensing valve with a vacuum channel in a boot of a valve priming station, then applying a vacuum to the vacuum channel of the boot via a vacuum chamber. The method further includes sensing a vacuum level in the vacuum chamber with a vacuum switch, then, in response to sensing a desired vacuum level in the vacuum chamber with the vacuum switch, automatically initiating the priming of the fluid dispensing valve.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

FIGS. 1-5 depict embodiments of an automated system 10 and method 11 for priming a fluid chamber 12 of a fluid dispensing valve 14. Fluid dispensing valves 14 are known in the art. One example of a suitable fluid dispensing valve 14 that may be utilized in the invention is the DispenseJet® DJ-9000 or DJ-9500 fluid jetting valve, available from Asymtek of Carlsbad, Calif. By way of example and with specific reference to FIG. 3, the fluid dispensing valve 14 may be supported, e.g., mounted on a robot 15, for automated motion along X, Y and Z axes and can utilize fluid 16, e.g., an adhesive, from a source of fluid material, such as a disposable fluid-filled barrel, cartridge, or syringe 18.

Figure 3:
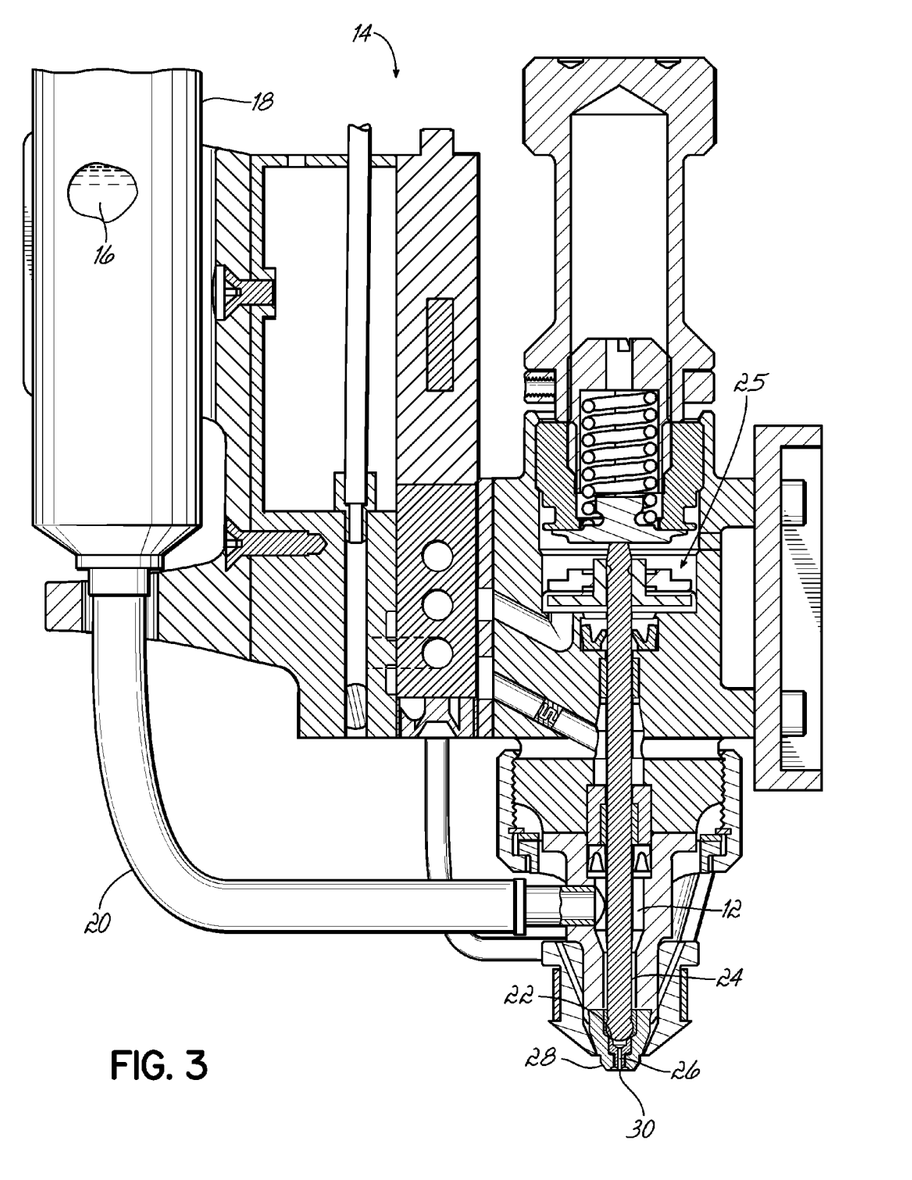
FIG. 3 is a cross-sectional view of a fluid dispensing valve for use with the valve priming system of FIG. 1.
Figure 4:
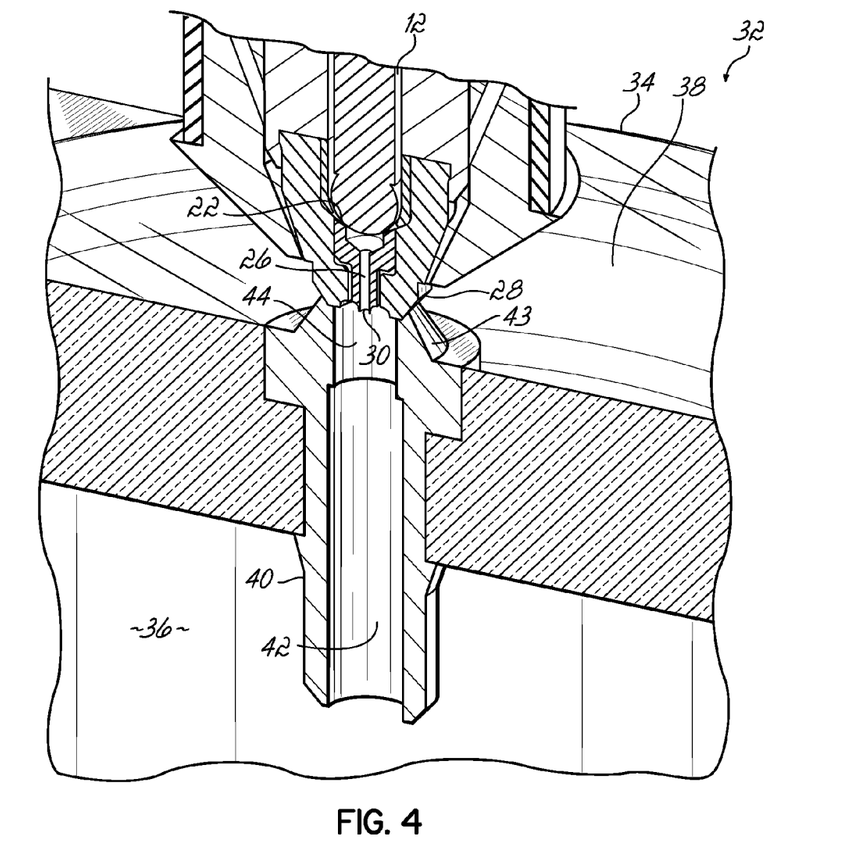
FIG. 4 is an enlarged perspective view of a portion of the boot of the valve priming system of FIG. 1 sealingly engaged with a distal tip of the fluid dispensing valve.

The fluid 16 from the fluid-filled syringe 18 is supplied to the fluid chamber 12 through a feed path 20 between the fluid source 18 and the fluid chamber 12. A valve seat 22 of the fluid dispensing valve 14 may be impacted by an air actuated hammer, or valve needle 24, to rapidly reduce the fluid volume residing within the fluid chamber 12 of the fluid dispensing valve 14. In the representative embodiment, a pneumatic actuator 25 drives the valve needle 24 relative to the valve seat 22. This action causes a jet of viscous material from discharge passage 26 of valve nozzle 28 to be ejected from dispensing orifice 30 and to break away therefrom as a result of its own forward momentum, thereby generating dots, which can be useful in adhesively securing components to circuit boards, underfilling surface-mounted components on a circuit board, etc., as is known in the art. As understood by a person having ordinary skill in the art, other types of fluid dispensing valves 14 may be used in conjunction with the automated system 10.

As shown in FIGS. 1-4, the automated system 10 for priming the fluid dispensing valve 14 in accordance with embodiments of the invention includes a valve priming station 32 having a hollow cylinder 34 defining a vacuum chamber 36 and which is capped by a lid 38. The lid 38 includes a centrally positioned boot 40 with a vacuum channel 42 extending therethrough which connects the interior of the vacuum chamber 36 with the external atmosphere. The boot 40 includes an annular protrusion 43 and a central opening 44 extending through the annular protrusion 43 that is in communication with the vacuum channel 42. The annular protrusion 43 is configured to sealingly engage the valve nozzle 28 of the fluid dispensing valve 14 so that the vacuum channel 42 and vacuum chamber 36 connect a vacuum source 46 in fluid communication with the fluid chamber 12 of the fluid dispensing valve 14.

Figure 1:
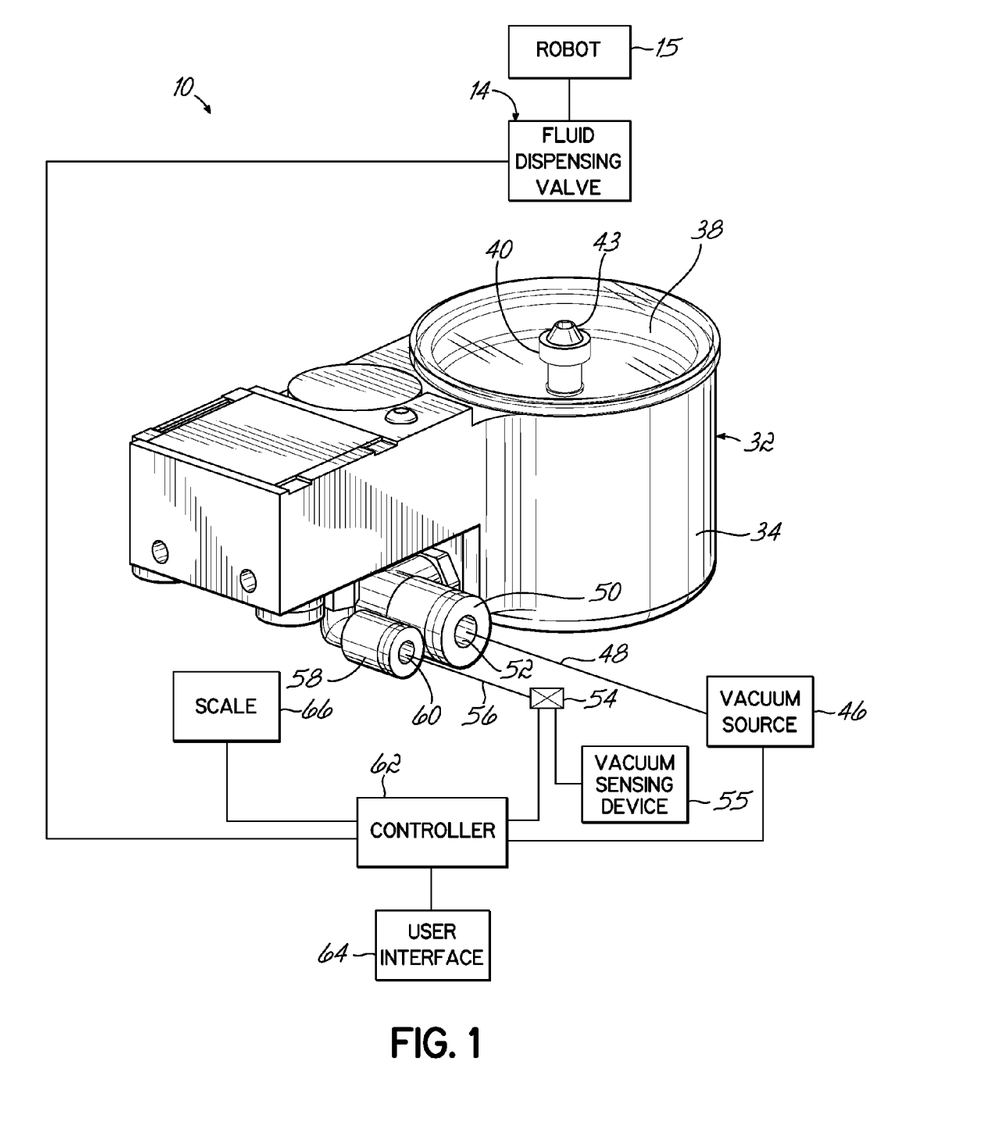
FIG. 1 is a perspective view of a valve priming system in accordance with an embodiment of the invention.
Figure 2:
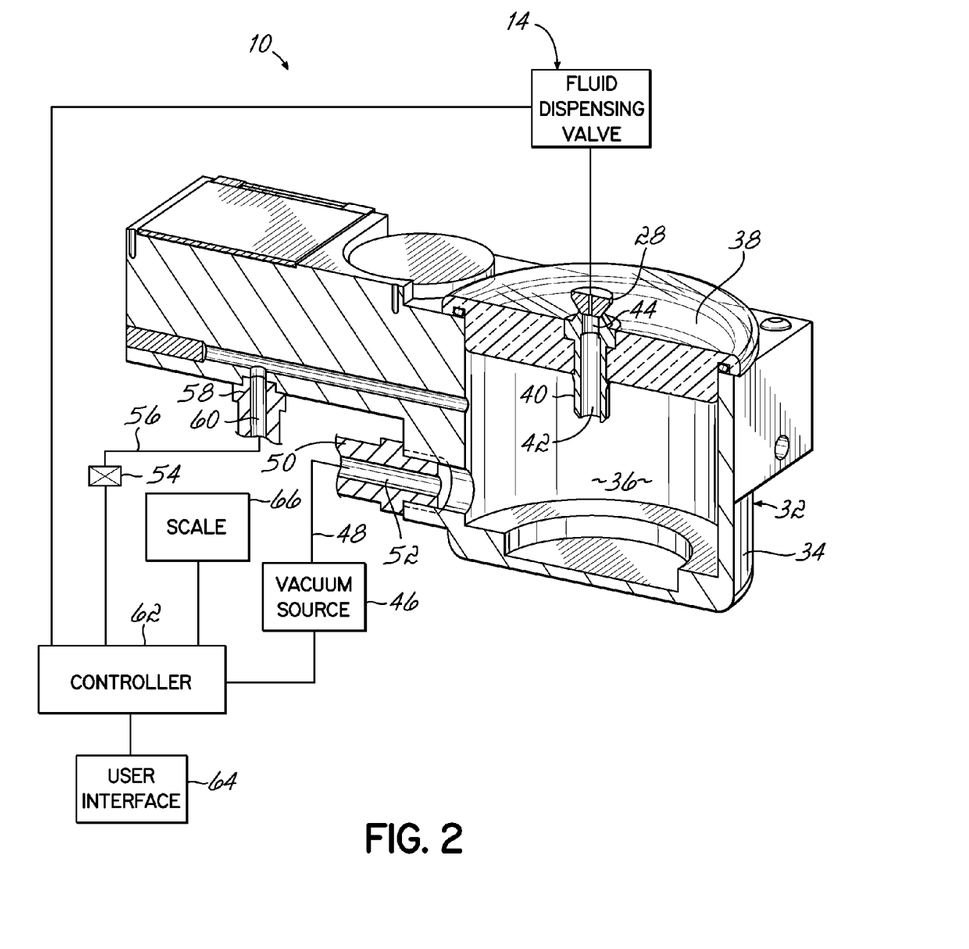
FIG. 2 is a cross-sectional view of the valve priming system of FIG. 1.

The vacuum source 46, such as a venturi-type vacuum generator, is connected to the vacuum chamber 36 via a vacuum line 48, which cooperates with a vacuum connector 50 having a channel 52 therethrough in fluid communication with the vacuum chamber 36. The vacuum source is configured to apply a vacuum, in the form of a pressure below atmospheric pressure, to the vacuum channel 42 of the boot 40 via the vacuum chamber 36.

A vacuum switch 54 is connected to the vacuum chamber 36 via vacuum switch line 56. The vacuum switch line 56 is connected to a vacuum switch connector 58, which has a channel 60 therethrough in fluid communication with the vacuum channel 42 via the vacuum chamber 36. The vacuum switch 54 is configured to detect whether a targeted or desired vacuum level, or pressure, is present in the vacuum chamber 36. In particular, the vacuum switch 54 can be configured to be in an opened (off) or closed (on) position based upon the vacuum level in the vacuum chamber 36 created by the vacuum source 46.

In one example, the vacuum switch 54 is configured to be closed if the vacuum level is at, or above, a desired vacuum level and configured to be opened if the vacuum level is below the desired vacuum level. One example of a suitable vacuum switch 54 that may be utilized in the invention is SMC ZSE40, which is a high precision digital pressure switch commercially available from SMC Corporation of America of Noblesville, Ind. As would be understood by one of ordinary skill in the art, the vacuum switch 54 includes a vacuum sensing device 55, e.g., a diaphragm, configured to respond to and, thus, sense the vacuum pressure in the vacuum chamber 36. Based upon whether the vacuum pressure is at, or above, a desired level, the vacuum switch 54 will be in the opened or closed position. The position of the vacuum switch 54, which can be detected by a controller 62, as discussed below, dictates various steps in the priming method 11.

The system 10 also includes a user interface 64 that is associated, e.g., electrically connected, with the controller 62 and configured to notify an operator (not shown) of errors associated with priming of the fluid dispensing valve 14. For example, the user interface 64 can be configured to notify the operator if the vacuum level has not reached and/or maintained a desired vacuum level after a specified amount of time. The user interface 64 also can be configured to notify the operator when priming is complete. The user interface 64 can include a computer monitor (not shown) and keyboard (not shown).

With continuing reference to FIGS. 1-4, the controller 62 is configured to control priming of the fluid dispensing valve 14 based upon whether the vacuum switch 54 is in the opened or closed position, i.e., indicative of whether the vacuum level is desirable or undesirable during priming. The controller 62 is in communication, e.g., electrically connected, with the vacuum source 46 and configured to turn the vacuum source 46 on and off, as needed. The controller 62 also is in communication, e.g., electrically connected, with the vacuum switch 54 and configured to determine whether the vacuum switch 54 is in an opened or closed position.

The controller 62 is electrically connected to the fluid dispensing valve 14 and configured to control fluid dispensing during priming of the fluid dispensing valve 14. For example, the controller 62 can be configured to command the fluid dispensing valve 14 to retract the valve needle 24 to allow access to the fluid chamber 12. To help cause the transfer of fluid 16 into the fluid chamber 12, the controller 62 can also be configured to cause the fluid 16 to flow, such as via air pressure, from the fluid source 18 through the fluid feed path 20 into the fluid chamber 12 for a first predetermined period of time when the vacuum switch 54 is in the closed position.

The controller 62 can be configured to notify the user interface 64 of errors experienced during the priming process. The controller 62 also connects the vacuum switch 54 to the fluid dispensing valve 14 and to the user interface 64 so that information can be exchanged therebetween or relayed therefrom to control priming of the fluid dispensing valve 14. In one example, the controller 62 may be a computer that includes one or more software programs capable of executing algorithms to control priming of the fluid dispensing valve 14 based upon whether the vacuum switch 54 is in the opened or closed position. Suitable connections via the controller 62 may be accomplished by networking the various devices 14, 54, 64 using known techniques.

A scale 66 is electrically connected with the controller 62 and configured to detect the weight of fluid 16 dispensed onto the scale 66 from the fluid dispensing valve 14 so as to determine whether the fluid dispensing valve 14 has been properly primed. The controller 62 is configured to move the fluid dispensing valve 14 over the scale 66 and cause the fluid dispensing valve 14 to dispense fluid 16 onto the scale 66 for a second predetermined period of time. The controller 62 is further configured to compare the weight of the fluid 16 dispensed onto the scale 66 with a reference value to verify that the fluid dispensing valve 14 has been properly primed. The controller 62 can also be configured to use the user interface 64 to communicate completion of the priming of the fluid dispensing valve 14 to the operator.

Figure 5:
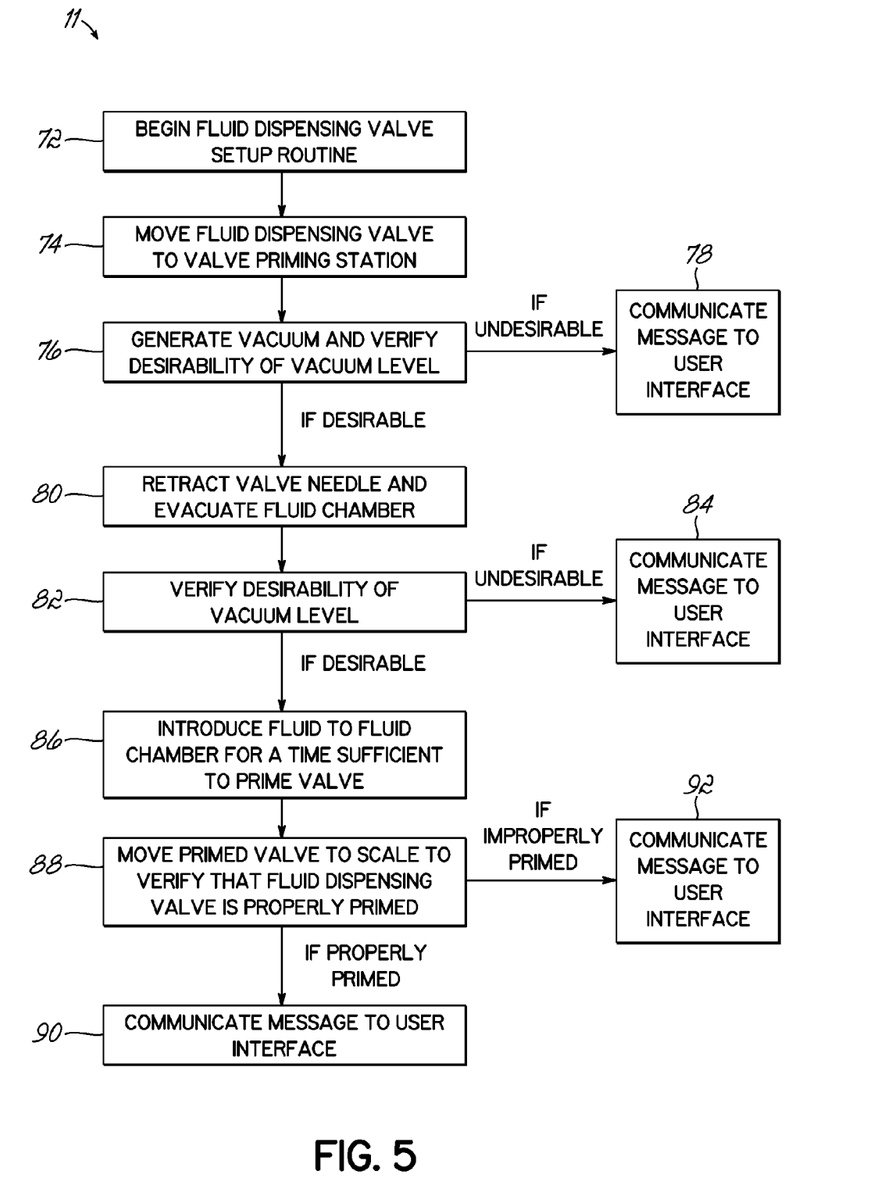
FIG. 5 is a block flow diagram of a method for priming a fluid chamber of a fluid dispensing valve in accordance with an embodiment of the invention.

With reference now to FIG. 5, the method 11 for priming the fluid chamber 12 of the fluid dispensing valve 14 in accordance with an embodiment of the invention is shown. The method 11 is automatic in that the priming operation is conducted with minimal human intervention and independent of external control, other than notifying an operator for intervention in the event of an error.

This method 11, or vacuum assisted priming routine (VAPR), generally begins with the fluid dispensing valve 14 and installation of the disposable fluid-filled syringe 18, as depicted in block 72. After installation of the disposable syringe 18, the fluid dispensing valve 14 can be moved by the robot to the valve priming station 32, as depicted in block 74, where the valve nozzle 28 is mated, or sealingly engaged, with the resilient priming boot 40 containing the vacuum channel 42 to which a vacuum is applied. In particular, an air-tight seal is formed about the dispensing orifice 30 situated in the valve nozzle 28 with the resilient boot 40 containing the vacuum channel 42 to which the vacuum is applied. The positioning of the valve nozzle 28 can be based on a taught X-Y purge location and 0.04"-0.06" Z interference between the valve nozzle 28 and the boot 40.

Next, the vacuum source 46 is activated by controller 62 and a vacuum applied to the vacuum channel 42, as depicted in block 76. A vacuum is created when the valve nozzle 28 is positioned in a proper location relative to the priming boot 40, i.e., when the boot 40 forms an airtight seal about the circumference of the valve nozzle 28. The vacuum switch 54 senses whether the desired vacuum level is present, i.e., the desired vacuum level is determined by whether the vacuum switch 54 is opened or closed, and communicates an indication of the presence of a desired vacuum level to the controller 62. For example, a closed vacuum switch 54 can signify a desirable vacuum level and an open vacuum switch 54 can signify an undesirable vacuum level. In one embodiment, the desirable vacuum level is at least 22 inches Hg (about 560 Torr). In another embodiment, the desirable vacuum level ranges from about 22 inches Hg to about 26 inches Hg (about 660 Torr). In yet another embodiment, the desirable vacuum level ranges from about 22 inches Hg to about 25 inches Hg (about 635 Torr). The value for the desired vacuum level can be operator designated, yet should be low enough to create a vacuum at a sub-atmospheric pressure that will satisfactorily prime the fluid dispensing valve 14.

As depicted in block 78, in response to not reaching the desired vacuum level after a specified amount of time, e.g., about 2 seconds, the controller 62 communicates an error message, such as "unable to generate vacuum" or "vacuum cannot be generated", to the user interface 64 for display so as to inform an operator of the condition. The absence of the desired vacuum level is determined by the controller 62 based upon the absence in the change of state of the vacuum switch 54 from open to closed or, alternatively, from closed to open. If the desired vacuum level is not achieved, application of the vacuum can be discontinued, and the operator can attend to resolving any issues before beginning the routine again. The specified amount of time can be operator designated, yet should be long enough to attain the desired vacuum level under normal operating conditions. In one example, the operator may have the ability to override the priming routine via the user interface 64.

Alternately, as depicted in block 80, in response to reaching the desired vacuum level, the controller 62, after the specified amount of time, communicates with the fluid dispensing valve 14 to retract the valve needle 24 so as to remove the obstruction between the fluid chamber 12 and valve nozzle 28 and allow access to the fluid chamber 12. Because of the pressure differential between the fluid chamber 12 and the vacuum chamber 36, the retracted valve needle 24 allows the fluid chamber 12 of the fluid dispensing valve 14 to be evacuated by the valve priming station 32. In particular, the vacuum can now be applied via the vacuum chamber 36 and vacuum channel 42 through the dispensing orifice 30 of the valve nozzle 28 to the discharge passage 26 and the fluid chamber 12 to remove air from the fluid chamber 12 and file the fluid chamber 12 with fluid 16. In one example, the vacuum is applied for about 10 seconds. The specified amount of time that the vacuum is applied can be operator designated, yet, should be long enough to satisfactorily evacuate the fluid dispensing valve 14.

During evacuation of the fluid chamber 12 in the fluid dispensing valve 14 by the valve priming station 32, as depicted in block 82, the desirability of the vacuum level is monitored and determined based on operation of the vacuum switch 54. Again, the vacuum switch 54 senses whether the desired vacuum level is present, i.e., the desired vacuum level is determined by whether the vacuum switch 54 is opened or closed. At this stage, as depicted in block 84, in response to not maintaining a desired vacuum level for the specified amount of time, the controller 62 communicates an error message, such as "unable to maintain vacuum" or "vacuum cannot be maintained", to the user interface 64 for display to inform the operator. At which time, application of the vacuum can be discontinued, and the operator can attend to resolving any issues before beginning the process again.

Alternately, as depicted in block 86, in response to maintaining the desired vacuum level, the controller 62, after the specified amount of time, communicates with the fluid dispensing valve 14 to force or cause fluid, via air pressure, e.g., an air-driven piston (not shown), to flow out of the syringe 18 for a first predetermined period of time through the fluid feed path 20 into the fluid chamber 12 and through the discharge passage 26 toward the dispensing orifice 30 to prime the fluid dispensing valve 14. The controller 62 controls the air pressure in the syringe 18 to help transfer the fluid 16, such as a liquid adhesive, into the fluid chamber 12. After causing the fluid 16 to flow through the fluid feed path 20 into the fluid chamber 12 for the first predetermined period of time, i.e., a time estimated to be sufficient to prime the fluid dispensing valve 14 with fluid 16, the valve needle 24 can be closed to close the path from the fluid chamber 12 to the valve nozzle 28 and application of the vacuum is discontinued. In one example, the time estimated to be sufficient to prime the fluid dispensing valve 14 with fluid 16 is about 5 seconds. The specified amount of time can be operator designated, yet, should be long enough to satisfactorily prime the fluid dispensing valve 14 using the valve priming station 32.

After application of the vacuum is discontinued, the now primed fluid dispensing valve 14, as depicted in block 88, can be tested for the presence of fluid 16 by dispensing the fluid 16 from the fluid dispensing valve 14 onto scale 66 for a desired period of time, e.g., 2 seconds, and measuring, i.e., weighing, the fluid 16. In one example, the primed valve 14 is moved from the priming station 32 to the scale 66 where, for example, 30 to 60 dots of fluid 16 can be dispensed in 0.5 seconds onto the scale 66 and weighed. The detected weight of the fluid 16 dispensed onto the scale 66 is compared to a threshold, or reference, value to verify that the fluid dispensing valve 14 has been properly primed with fluid 16.

If the weight of fluid 16 measured by the scale 66 exceeds a threshold value of weight, e.g., 5 mg, priming is considered complete. The threshold value of weight generally is greater than, or equal to, a weight that is known to provide a properly primed fluid dispensing valve 14 within the selected time period for dispensing the fluid 16. At this point, as depicted in block 90, the controller 62, which is in communication with the scale 66, can communicate with the user interface 64 to inform the operator that priming is complete by displaying a message on the computer screen, e.g., "Jet priming complete" or "Prime is completed". The fluid dispensing valve 14 is now ready for assembly line operation or subjected to additional set-up steps, including measuring dispensed dot placement accuracy, for example. After completion, the priming process can be repeated, as desired.

If priming is incomplete, the controller 62 can communicate with the user interface 64 by displaying a message on the computer screen, e.g., "Jet priming incomplete" or "Valve did not prime", as depicted in block 92. At which time, the priming method 11 is discontinued, and the operator can attend to resolving any issues before beginning the method again.

The automated system 10 and method 11 in accordance with embodiments of the present invention provide improved dispense weight consistency, eliminates operator influences, and provides faster priming and quicker set-up. In addition, there is reduced fluid consumption resulting in lower operating costs. Also, such system 10 provides a level of process automation and system verification that can ensure consistent priming quality of the fluid dispensing valve 14.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An automated system for priming a fluid chamber of a fluid dispensing valve with fluid from a source of fluid material supplied to the fluid chamber through a feed path between the fluid source and the fluid chamber, the fluid dispensing valve mounted on a robot, and the system comprising:
   a vacuum source;
   a valve priming station including a boot, a vacuum chamber, and a vacuum channel in the boot, the vacuum channel connected with the vacuum source via the vacuum chamber, and the boot configured to sealingly engage a valve nozzle of the fluid dispensing valve so that the vacuum channel and vacuum chamber connect the vacuum source in fluid communication with the fluid chamber of the fluid dispensing valve when the dispensing valve is open;
   a vacuum switch coupled in fluid communication with the vacuum chamber, the vacuum switch having an opened position and a closed position based upon a vacuum level in the vacuum chamber; and
   a controller electrically connected with the vacuum source and configured to power the vacuum source on and off, and wherein the controller is electrically connected with the vacuum switch and configured to control priming of the fluid dispensing valve based upon whether the vacuum switch is in the opened or closed position, wherein the controller is configured to power off the vacuum source, to cause the robot to move the fluid dispensing valve over a scale, to cause the fluid dispensing valve to dispense fluid onto the scale, and to compare the weight of the fluid dispensed onto the scale to a reference value to verify that the fluid dispensing valve has been properly primed.

2. The system of claim 1 wherein the vacuum switch is configured to be in a closed position when the vacuum level is at, or above, a desired level and wherein the vacuum switch is configured to be in an opened position when the vacuum level is below the desired level.

3. The system of claim 1 further comprising:
   a vacuum line connecting the vacuum source with the vacuum chamber.

4. The system of claim 1 wherein the controller is configured to cause the fluid to flow from the fluid source through the fluid feed path into the fluid chamber for a first predetermined period of time when the vacuum switch is in the closed position to prime the fluid dispensing valve.

5. The system of claim 4 wherein the source of the fluid material is a pressurized syringe and wherein, after the start of the first predetermined period of time, the controller is configured to increase air pressure in the syringe for a second predetermined period of time to push the fluid into the fluid chamber.

6. The system of claim 1 wherein the controller is electrically connected with the fluid dispensing valve and configured to control fluid dispensing during priming of the fluid dispensing valve.

7. The system of claim 1 wherein the controller is a computer that includes one or more software programs capable of executing algorithms to control priming of the fluid dispensing valve.

8. The system of claim 7 further comprising:
   a user interface associated with the controller and configured to notify an operator of errors associated with priming of the fluid dispensing valve.

9. The system of claim 8 wherein the user interface is configured to notify the operator if the vacuum level has not reached a desired vacuum level after a specified amount of time-the vacuum level has not maintained a desired vacuum level after a specified amount of time.

10. The system of claim 9
   wherein the scale is electrically connected with the controller, and the controller is configured to use the user interface to communicate completion of the priming of the fluid dispensing valve to the operator.

11. The system of claim 1 wherein the boot includes an annular protrusion and a central opening extending through the annular protrusion that is in communication with the vacuum channel, the annular protrusion configured to sealingly engage the valve nozzle of the fluid dispensing valve.

12. A method for priming a fluid dispensing valve, the method comprising:
   a) sealingly engaging a valve nozzle of a fluid dispensing valve with a vacuum channel in a boot of a valve priming station;
   b) applying a vacuum to the vacuum channel of the boot via a vacuum chamber;
   c) sensing a vacuum level in the vacuum chamber with a vacuum switch; and
   d) in response to sensing a desired vacuum level in the vacuum chamber with the vacuum switch, automatically initiating the priming of the fluid dispensing valve; e) after the fluid dispensing valve has been primed, dispensing fluid from the fluid dispensing valve onto a scale for a first predetermined period of time; and f) comparing a detected weight of the fluid dispensed onto the scale to a reference value to verify that the fluid dispensing valve has been properly primed.

13. The method of claim 12 further comprising:
in response to sensing an undesired vacuum level in the vacuum chamber with the vacuum switch, discontinuing the application of the vacuum.

14. The method of claim 12 further comprising:
after sensing the desired vacuum level in the vacuum chamber, opening the valve nozzle of the fluid dispensing valve;
applying a vacuum through the opening of the valve nozzle via the vacuum chamber;
sensing a vacuum level in the vacuum chamber with the vacuum switch; and
in response to maintaining a desired vacuum level in the vacuum chamber with the vacuum switch, automatically causing a fluid to flow from a fluid source through a fluid feed path into a fluid chamber and through a discharge passage toward a dispensing orifice of the fluid dispensing valve for a first predetermined period of time to prime the fluid dispensing valve.

15. The method of claim 14 further comprising:
closing the valve nozzle of the fluid dispensing valve; and
discontinuing application of the vacuum.

16. The method of claim 15 further comprising:
informing an operator via a user interface whether priming is considered complete based upon the comparison of the detected weight of the fluid dispensed with the reference value.

17. An automated system for priming a fluid chamber of a fluid dispensing valve with fluid from a source of fluid material supplied to the fluid chamber through a feed path between the fluid source and the fluid chamber, the fluid dispensing valve mounted on a robot, the system comprising:
a vacuum source;
a valve priming station including a boot, a vacuum chamber, and a vacuum channel in the boot, the vacuum channel connected with the vacuum source via the vacuum chamber, and the boot configured to sealingly engage a valve nozzle of the fluid dispensing valve so that the vacuum channel and vacuum chamber connect the vacuum source in fluid communication with the fluid chamber of the fluid dispensing valve when the dispensing valve is open;
a vacuum sensing device in fluid communication with the vacuum chamber, the vacuum sensing device sensing the vacuum level in the vacuum chamber; and
a controller electrically connected with the vacuum source and configured to power the vacuum source on and off, and wherein the controller is electrically connected with the vacuum sensing device and configured to control priming of the fluid dispensing valve based upon an input from the vacuum sensing device,
wherein, after the fluid dispensing valve has been primed, the controller causes the robot to move the fluid dispensing valve over a scale and causes the dispensing valve to dispense fluid onto the scale.

18. The automated system of claim 17 wherein the controller further comprises a user interface.

19. The automated system of claim 18 wherein the controller monitors the vacuum sensing device for a predetermined time period and notifies the operator via the user interface of an error condition if the vacuum sensing device does not indicate that a desired vacuum level has been reached by the end of the predetermined time period.

20. The automated system of claim 17 wherein if the position of the vacuum sensing device indicates to the controller that the desired vacuum level has been reached, the controller opens the fluid dispensing valve to put the fluid chamber within dispensing valve in fluid communication with the vacuum chamber.

21. The automated system of claim 20 wherein, after the controller opens the fluid dispensing valve, the controller monitors the position of the vacuum sensing device to verify that the desired vacuum level is present.

22. The automated system of claim 21 wherein, if the controller determines that the desired vacuum level is not present, the controller generates an error signal at the user interface.

23. The automated system of claim 20 wherein, after the dispensing valve is open, the controller helps to cause the transfer of fluid into the fluid chamber by applying air pressure to the fluid source to push fluid from the fluid source into the fluid chamber.

24. The automated system of claim 23 wherein the controller applies air pressure to the fluid source for a predetermined time period.

25. The automated system of claim 24 wherein after the predetermined time period, the controller closes the dispensing valve and powers the vacuum source off.

26. The automated system of claim 25 wherein the fluid dispensing valve is moved over the scale after the controller closes the dispensing valve and powers the vacuum source off.

27. The automated system of claim 17 wherein the vacuum sensing device is a vacuum switch.

* * * * *